United States Patent Office 2,894,047
Patented July 7, 1959

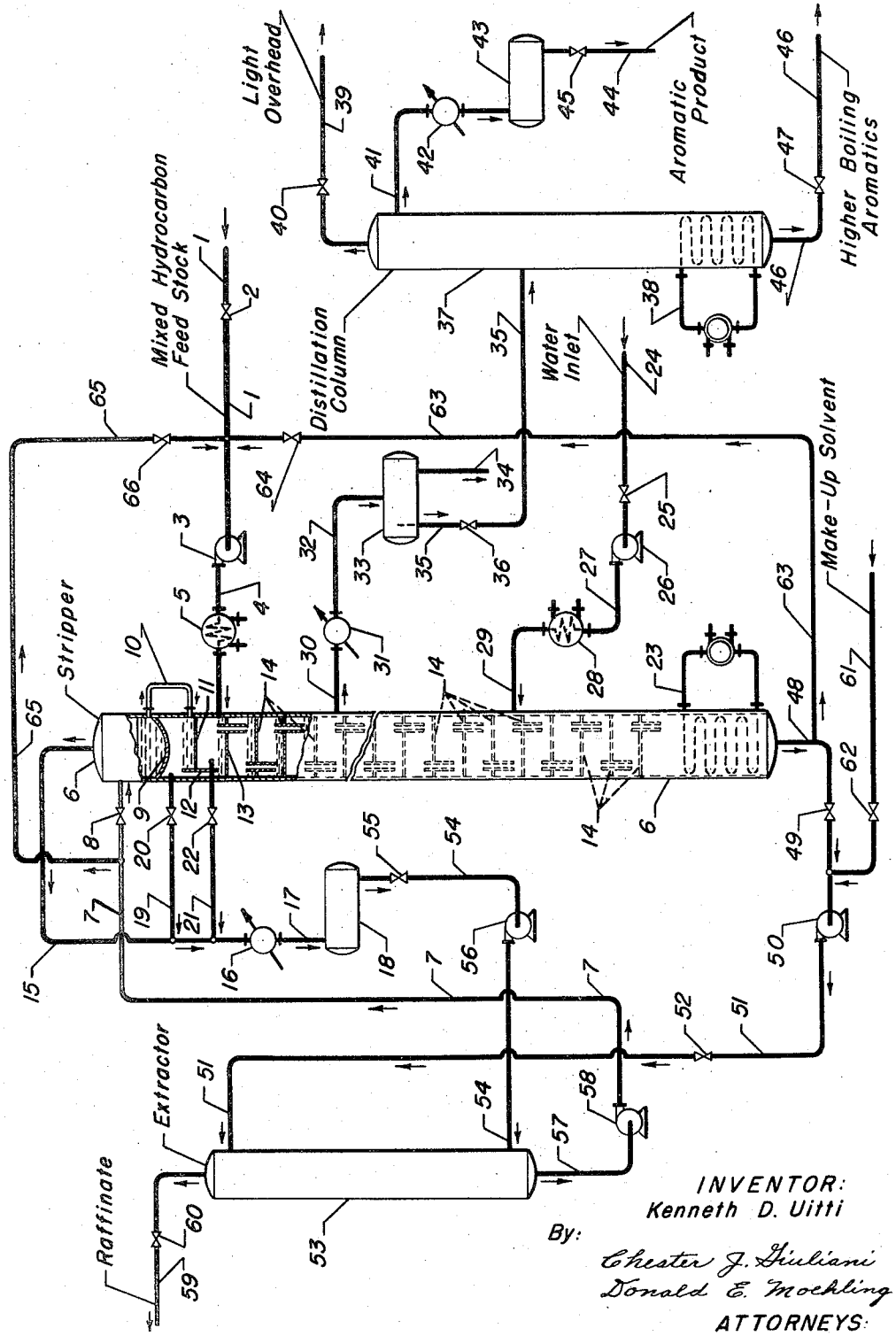

2,894,047

SOLVENT EXTRACTION PROCESS FOR TREATMENT OF HIGHLY AROMATIC FEED STOCKS

Kenneth D. Uitti, Westmont, Ill., assignor, by mesne assignments, to Universal Oil Products Company, Des Plaines, Ill., a corporation of Delaware Application July 1, 1955, Serial No. 519,317

9 Claims. (Cl. 260—674)

This invention relates to a method for recovering the aromatic components of a mixture of hydrocarbons and is particularly adapted to such a recovery process applied to hydrocarbon mixtures containing a large concentration of the aromatic component therein. More specifically, this invention concerns a combination solvent extraction-extractive distillation process for recovering aromatic hydrocarbons from hydrocarbon mixtures containing the same in relatively high concentrations.

It is one object of this invention to provide a process for recovering the aromatic components of a hydrocarbon mixture containing a large proportion of said aromatic components and to provide a process to be operated under conditions whereby substantially all of the aromatic components of the feed stock mixture are recovered in highly purified form. Another object of the invention is to provide a hydrocarbon extraction process which may be operated economically and with a minimum loss of feed stock and solvent.

In accordance with one of its embodiments, the present invention concerns a process for recovering an aromatic hydrocarbon from a hydrocarbon mixture containing aromatic and non-aromatic hydrocarbons in which the aromatic content is at least 75% by weight of said mixture, which comprises contacting the mixture in an extraction zone with a solvent composition derived in a subsequent stage of the process, maintaining the solvent composition at a temperature above the boiling point of said mixture and below the boiling point of said solvent, forming thereby a rich solvent phase containing a substantial proportion of the aromatic components of said mixture, separating a vapor overhead comprising the non-aromatic hydrocarbons present in said mixture from a rich solvent residue, separately recovering from the rich solvent residue an aromatic hydrocarbon fraction and an ultimate lean solvent residue, and separately contacting said ultimate solvent residue with said vapor overhead at counter-current solvent extraction conditions to form said solvent composition.

A more specific embodiment of the invention relates to the combination extractive distillation-solvent extraction process of the above embodiment, further characterized in that said hydrocarbon mixture is contacted, prior to its introduction into said extraction zone with a solvent stream selected from said lean solvent residue and said solvent composition, utilizing a sufficient quantity of said solvent stream to dissolve substantially all of said hydrocarbon mixture.

Other embodiments of this invention relating to the preferred methods of effecting the present separation will be hereinafter referred to in greater detail.

The process of the present invention is applicable with particular effectiveness to the extraction method of separating hydrocarbon mixtures containing aromatic hydrocarbon components for the recovery of substantially pure aromatic hydrocarbon products and is more particularly applicable to such hydrocarbon mixtures containing a large concentration of aromatic hydrocarbons in the feed stock mixture to be separated, preferably hydrocarbon mixtures containing at least 75% by weight of aromatic components. When applied to such hydrocarbon mixtures which contain a large proportion of aromatic constituents, the process is operated under conditions of temperature, pressure and solvent composition to produce a rich solvent phase in the extractive distillation zone containing all or substantially all of the aromatic constituents charged to the process as the hydrocarbon feed stock.

Although the process is particularly effective for the separation of monocyclic aromatic hydrocarbons from paraffinic hydrocarbons mixed therewith, under modified process conditions the process can be operated effectively for the recovery of polycyclic aromatic hydrocarbons, such as naphthalene, alkyl naphthalenes, anthracene and other polynuclear aromatic hydrocarbons which may be mixed with naphthenes, olefinic hydrocarbons and cycloolefins. The process may be applied with particular advantage to the separation of constant boiling hydrocarbon mixtures which normally are difficult to separate by simple distillation means, such constant boiling mixtures including fractions of petroleum or petroleum conversion products containing $C_6$, $C_7$ and $C_8$ aromatic, paraffinic and olefinic hydrocarbons, wherein the object is to recover benzene, toluene and/or xylene therefrom. A preferred source of such hydrocarbon mixtures is an appropriately boiling fraction of a thermally or catalytically reformed petroleum product, the reforming reaction being effected in the presence of hydrogen under conditions whereby the aliphatic components are hydrogenated to paraffinic hydrocarbons, while the aromatic structure of the cyclic components is retained. It is generally preferred in operating the present process that any olefinic components initially present in the raw feed be hydrogenated to their saturated analogs prior to treatment herein, since the resolution between aromatic and saturated hydrocarbons of both the aliphatic and naphthenic types is more readily and effectively accomplished with a majority of the solvents utilized in the present process than is the resolution between aromatic and olefinic hydrocarbon types.

Compounds which may be utilized as the primary solvent in the present combination process, the compound acting as a solvent in the extraction stage of the process and as the hydrocarbon entrainer in the extractive distillation stage of the present combination process, are selected from the general group of compounds broadly characterized as oxygen-containing organic compounds. Particularly suitable as the primary solvents are the aliphatic and cyclic alcohols, the glycols and glycol ethers (also referred to as polyglycols or poly-(oxyalkylene)-glycols; as well as the glycol and polyglycol esters and ether-esters. The alkylene glycols and poly-(oxyalkylene)-glycols which are a particularly effective class of solvents utilizable in the present process include the mono-, di-, tri-, and tetra-(oxy-alkylene)-glycols, particularly diethylene glycol and triethylene glycol, either individually or in admixture with monopropylene glycol, dipropylene glycol or tripropylene glycol. Another preferred class of solvents are the compounds characterized as glycol ethers, such as the "Cellosolve" series of compounds (defined as the alkyl ethers of ethylene glycol), including the methyl-, ethyl-, propyl-, and butyl-Cellosolves; the Carbitols defined as the alkyl ethers of diethylene glycol (such as methyl-, ethyl-, propyl-, and butyl-Carbitol); the glycol and polyglycol esters of low molecular weight aliphatic acids such as the acetates and propionates; hydroxy aromatic compounds such as phenol, resorcinol, and pyrocatechol; the alkyl substituted derivatives of the above hydroxy aromatic compounds and the alkyl ethers thereof, such as the ortho-, beta-, and para-cresols, thymols, guaicol and other organic compounds which selectively dissolve aromatic hydrocarbons from mixtures of the same with aliphatic and cyclic saturated hydrocarbons and which boil at temperatures above the boiling point of the feed stocks utilized in the present process.

The present solvents preferably contain a relatively small proportion of water dissolved therein to increase the selectivity of the solvent composition without reducing substantially its solvency for the aromatic hydrocarbon component of the feed stock mixture. The presence of water in the solvent composition, furthermore, provides a relatively volatile material therein which may be distilled from the rich solvent in the stripping zone (the extractive distillation step of the present process) for vaporizing the last traces of aromatic hydrocarbon from the rich solvent stream by steam distillation. The solvent composition may contain from about 2% to about 20% by weight of water and preferably from about 5% to about 15%, depending upon the particular primary solvent utilized and the process conditions at which the extraction and extractive distillation stages are operated.

The invention will be further described with respect to its several embodiments and illustrated in the accompanying diagram which is a flow diagram of a suitable process for accomplishing the objects of this invention and which illustrates the component units of apparatus suitable for effecting the process, although it is not intended that the invention be necessarily limited to the specific flow illustrated in the diagram, various alternative means also being comprised within the scope of this invention, although not necessarily illustrated thereby.

In its broad aspects the invention is directed to a process for recovering one or more aromatic components of a mixed hydrocarbon feed stock by charging the latter into the upper protion of a stripping column in which extractive distillation occurs by virtue of the temperature and pressure conditions maintained on the aforesaid relatively non-volatile solvent introduced therein with the feed stock and/or above the inlet port therefor, the solvent tending to depress the boiling point of the aromatic components present in the feed stock by dissolving these components into the solvent composition. The non-aromatic constituents whose boiling points are not substantially affected by the presence of the solvent in the upper contacting section of the stripping column, are released through a vapor outlet at the top of the stripping column, the fraction usually containing at least a small portion of the aromatic components of the feed stock which are present therein as a result of maintaining the solvent at or near the boiling point of the feed stock. The overhead vapor is condensed and subjected to countercurrent solvent extraction to form a rich solvent phase which is removed from the extractor and charged to the stripping column as the solvent composition utilized therein, while the non-extracted solvent-insoluble portion of the overhead leaves the upper portion of the extractor as a by-product of the process. The aromatic product is recovered as a higher boiling cut from the stripping column, leaving a solvent residue substantially free of hydrocarbon solute which is recycled from the bottom of the stripping column to the upper portion of the extractor as the lean or regenerated solvent charged thereto.

Referring to the accompanying diagram, a mixture of hydrocarbons containing aromatic hydrocarbon components is introduced into the process flow through line 1 in amounts controlled by valve 2, preferably premixed with at least a portion of the solvent, as hereinafter described, and transferred alone or with the solvent by means of pump 3 into line 4 containing in series a heat exchanger 5 which may either cool or heat the charged hydrocarbon and solvent streams to the temperature desired in the extractive distillation stage of the process, effecting in stripping column 6. One of the preferred methods for effecting azeotropic distillation of the feed stock utilized in the present process comprises introducing both the feed stock and the solvent composition in liquid phase into the upper portion of a distillation column wherein the pressure is maintained at a relatively high value at the point at which the feed stock and solvent are contacted and in the lower portions the pressure is reduced in stages to permit the rich solvent phase formed in the initial contacting zone (wherein extraction also occurs) to be stripped at a lower temperature as the rich solvent flows downwardly into the heating or reboiling section of the stripping column. For this purpose the extractive distillation zone, herein referred to as stripping column 6, is constructed in a manner designed to seal the various pressure reduction stages from each other by the liquid phases accumulating in each stage. Thus, a solvent stream which is derived at least in part from an extraneous extraction column, hereinafter described, is introduced into stripping column 6 through line 7 in controlled amounts determined by valve 8, the solvent entering the highest pressure stage which is sealed from the lower portions of the column by means of pan 9. The solvent thereafter flows through line 10 into the next lower pressure zone above tray 11, the solvent overflowing weir 12 onto tray 13, the third pressure reduction zone, which is sealed from its next superadjacent tray by the liquid level maintained on the tray, then flowing to tray 14. The aromatic-containing hydrocarbon feed stock is introduced into stripping column 6 on any convenient tray, preferably on one of the uppermost trays such as the tray above pan 9 or more preferably in solution in the solvent, as hereinafter described, the mixture of hydrocarbons contacting the downwardly flowing solvent stream under extractive distillation conditions whereby the non-aromatic components of the feed stock are vaporized and the aromatic components dissolve in the solvent. As heretofore indicated, the solvent composition is selected from the liquid organic compounds having a selective solvency for aromatic hydrocarbons and which boil at temperatures above the boiling point of any component present in the mixed hydrocarbon feed stock, and thus remains substantially in liquid phase during its residence within the stripping column. One of the preferred solvent compositions for this purpose is one of aforementioned polyalkylene glycols or mixtures thereof, such as diethylene glycol, which preferably contains a minor proportion of dissolved water. The solvent selectively retains in solution the aromatic components of the feed stock mixture, producing a rich solvent stream which separates as a liquid phase from the vaporized, non-aromatic hydrocarbons present in the stripping column as a vapor phase, this effect being a characteristic of the present solvent which is selected on the basis of its selectivity for aromatic hydrocarbons. Although a major proportion of the aromatic hydrocarbons introduced into the column as the feed stock mixture dissolve in the solvent to form a rich solvent stream which flows downwardly into the lower portions of the stripping column, carrying the aromatic-rich solvent into the reboiling section of the column, at least a small portion of the aromatic constituents are nevertheless vaporized in the upper section of the column, along with the non-aromatic components of the feed stock because of the small but significant vapor pressure of the aromatic solute, even at the overhead vapor temperature. These aromatic components, therefore, appear in the overhead vapor stream leaving the top of the stripping column, along with substantially all of the non-aromatic hydrocarbons through line 15. The resulting light vapor overhead is preferably condensed to a liquid in heat exchanger 16 and the resulting liquid condensate transferred through line 17 into receiver 18. A second vapor stream may also be removed from the second pressure reduction stage through line 19 and valve 20, the stream joining the vapor line 15 leading into condenser 16. Similarly, a third vapor draw-off may be provided for withdrawing vapor from the third pressure reduction stage above tray 13 through line 21 and valve 22, the vapors which comprise the last trace of paraffins and other non-aromatic solute in the rich solvent stream also joining the overhead vapors in line 15 flowing through condenser 16 and finally into receiver 18 as liquid condensate. The side cut streams removed from column 6 through lines 19 and 21 contain progressively larger proportions of aromatic hydrocarbons and because of these draw-offs contain predominantly aromatic hydrocarbon product and relatively small proportions of non-aromatic impurities, lines 19 and 21 may alternatively be eliminated, thus providing for withdrawal of the entire vapor overhead through line 15. Thus, the entire reduction in pressure may, if desired and so designed, take place in one stage, that is, between plates 9 and 11, with the entire quantity of non-aromatic impurity dissolved in the rich solvent being withdrawn in one vapor overhead stream from column 6.

As the fat solvent stream flows downwardly through the extractive distillation column, it is stripped of its dissolved hydrocarbon components by heat introduced through reboiler coil 23 in the lowermost portion of the column and by steam injected into the column above the reboiler coil 23. For this purpose water is injected into column 6 through line 24 in amounts controlled by valve 25, the water being transferred by means of pump 26, through line 27 into heater 28 which generates steam, preferably at the temperature and pressure existing within stripping column 6, the resulting steam being thereafter introduced into column 6 through line 29. The steam thus mixed with the fat solvent not only vaporizes the last trace of hydrocarbon solute from the fat solvent stream, but when utilizing a solvent composition containing dissolved water, the steam lowers the boiling point of the fat solvent stream by increasing the proportion of water therein. A relatively pure aromatic hydrocarbon product, that is, a product free of substantially all of its non-aromatic constituents is removed as a vapor side cut from the stripping column between the reboiler and the feed introduction point through line 30, cooled to a liquid condensate in condenser 31, and the condensate transferred by means of pipe 32 into storage receiver 33 from which it may be removed when desired through line 34. Depending upon the boiling range of the initial feed stock mixture to the process, the hydrocarbon product recovered may consist of a single, substantially pure aromatic hydrocarbon, or may comprise a mixture of aromatic hydrocarbons which may subsequently be fractionally distilled to recover one or more pure aromatic hydrocarbon fractions therefrom. For this purpose the liquid condensate in receiver 34 comprising a mixture of all of the aromatic components present in the original feed stock is transferred through line 35 in amounts desired for distillation, as determined by valve 36, and charged into fractional distillation column 37 wherein the mixed aromatic hydrocarbons are separated by fractional distillation. A reboiler coil 38 in the lower portion of column 37 is provided to vaporize the lowest boiling component of the mixture of hydrocarbons charged, the vapors leaving the column as overhead through line 39 and valve 40. This overhead may consist of light paraffins or may comprise hydrocarbons undesired in the aromatic hydrocarbon product. The lowest boiling aromatic component is removed as a side cut from column 37 through line 41, liquefied in condenser 52 and collected in receiver 43 from which it may be withdrawn as desired through line 44 and valve 45. The higher boiling aromatic components separated from stripping column 6, if any, are removed as bottoms through line 46 and valve 47 and may be charged into a series of distillation columns to separate the bottoms into constituent fractions, if the charge to the column is a mixture of more than 2 aromatic components.

The fat solvent residue accumulating in the bottom of stripping column 6 from which substantially all of the hydrocarbon solute has been vaporized and which is generally reconstituted to its desired water content for use as selective solvent in the system is withdrawn from column 6 through line 48 and valve 49 and thereafter transferred as recycle lean solvent to the extraction stage of the present process by means of pump 50 into line recycle 51, through valve 52 at the rate desired for counter-current solvent extraction in column 53. The mixture of light overhead and lowest boiling fractions vaporized from the rich solvent stream in stripping column 6 and accumulated in receiver vessel 18 contains a substantial proportion of aromatic hydrocarbons which, together with the aliphatic constituents of the fat solvent stream, remain in vapor form in stripping column 6. In order to recover the desired aromatic components from the latter combined overhead fractions, the mixture is contacted with the solvent composition to form a rich solvent stream containing dissolved aromatics and a non-aromatic, substantially insoluble raffinate in the solvent extraction stage of the present process, the solvent utilized for this purpose being the lean solvent residue of the extractive distillation or stripping stage of the process, derived as hereinabove indicated. By thus utilizing the lean solvent to initially extract the aromatic constituents from the light vapor overhead from the stripping column, maximum recovery of the aromatic components from this stream and the maximum total recovery of aromatic hydrocarbons is made possible. The resulting solvent-extract has only a portion of its capacity for solvent extraction saturated as a result of the initial countercurrent solvent extraction and may thus be readily utilized as the solvent charged to the extractive distillation stage of the process. For this purpose the mixed hydrocarbons which accumulate in receiver 18 are removed therefrom through line 54 and valve 55 by means of pump 56, being charged into the bottom of countercurrent extraction column 53 wherein the mixture of hydrocarbons flows upwardly in the column, in countercurrent relationship to the more dense solvent introduced into the upper portion of extraction column 53, the solvent selectively dissolving the aromatic constituents from the hydrocarbon feed at the solvent extraction conditions maintained within the extractor. The resulting solvent stream, partially saturated with aromatic hydrocarbons, is removed from zone 53 through line 57 and transferred by means of pump 58 into line 7 which feeds the partially saturated solvent stream into the top of extractive distillation zone 6 wherein the solvent acts as hereinbefore described to effect extractive distillation of the mixed hydrocarbon feed stock. The non-extracted, almost wholly aliphatic hydrocarbon components derived initially from the feed stock as overhead from column 6 and charged to the top of extraction zone 53 for use as feed stock therein are finally removed from the process flow through line 59 and valve 60. Extraction column 53 is operated at a temperature and pressure sufficient to provide maximum solvency and selectivity for the aromatic hydrocarbon components of the feed stream, while maintaining the lean and fat solvent streams in substantially liquid phase at the temperature of extraction. Any solvent required to replace losses in the system may be admitted into the process flow through line 61 in amounts controlled by valve 62.

The present process has been described above in connection with one of the alternative means of introducing the mixed hydrocarbon feed stock and solvent composition into the extractive distillation zone of this invention, the above described method comprising introducing these streams separately into the extractive distillation zone.

A particularly preferred alternative to the above method for effecting extractive distillation comprises premixing the hydrocarbon feed stock with the solvent before charging the resultant mixture into the extractive distillation zone 6, the solvent being either the regenerated lean solvent composition or the partially saturated fat solvent stream recovered from extractor 53. In accordance with the latter preferred alternative process, lean solvent from which the hydrocarbon solute has been vaporized is removed as a side stream from line 48 through line 63 in controlled amounts, determined by valve 64, and charged into line 1 wherein it is thoroughly mixed with the hydrocarbon feed stock, also introduced into the process flow through line 1. Pump 3 not only serves to lift the lean solvent from line 48 to line 1, but also serves to effect intimate mixing of the solvent and hydrocarbon feed stock charged into the process. The volume of solvent thereby mixed with the hydrocarbon feed stock is preferably sufficient to dissolve substantially completely the aromatic constituents of the feed stock, although complete dissolution in the solvent is not essential. Thus, from about 0.5 to 1 to about 10 to 1, preferably from 1 to 1 to about 5 to 1, volume proportions of solvent to feed stock are charged into line 1, as desired for this purpose. Since the temperature of the regenerated solvent is generally quite high, the feed stock readily dissolves in the solvent at the point of mixing, although the mixture may be further increased in temperature and further dissolution of the feed stock in the solvent effected by heating the mixture in heater 5.

The solvent supplied to the premixing stage may also consist of the partially saturated fat solvent stream recovered from extractor 53, the solvent utilized for this purpose being bled off from line 7 in through line 65 and valve 66 and charged into line 1 wherein the solvent and feed stock are mixed as aforesaid before being charged into extractive distillation zone 6. The solvent charging rate may be substantially as above specified for the use of regenerated lean solvent.

It has been found that by operating the process in accordance with the above preferred methods, more efficient extractive distillation is obtained in column 6 and purer aromatic products may be thereby recovered.

I claim as my invention:

1. A process for recovering an aromatic hydrocarbon from a hydrocarbon mixture containing aromatic and non-aromatic hydrocarbons of which the aromatic content is at least 75% by weight of said mixture, which comprises introducing said mixture and a solvent composition, formed as hereinafter set forth, to the upper portion of a stripping column and therein subjecting the mixture to extractive distillation while maintaining the solvent composition at a temperature above the boiling point of said mixture and below the boiling point of the solvent, forming thereby a rich solvent phase containing a substantial proportion of the aromatic components of said mixture, removing a vapor overhead comprising the non-aromatic hydrocarbons present in said mixture from the upper portion of the distillation column, vaporizing an aromatic fraction and from said rich solvent phase in and removing the same from an intermediate portion of the column, removing a lean solvent residue from the lower portion of the column, condensing said vapor overhead and subjecting the resultant condensate to liquid phase solvent extraction by countercurrent contact with said lean solvent residue in an independent extraction zone, and introducing the resultant enriched solvent from said independent zone to the upper portion of the distillation column as said solvent composition.

2. The process of claim 1 further characterized in that said mixture comprises at least one aromatic hydrocarbon of the group consisting of benzene, toluene, and xylene.

3. The process of claim 1 further characterized in that the temperature maintained in contacting said mixture with said solvent composition is sufficient to vaporize into said vapor overhead all of the paraffinic components of said mixture.

4. The process of claim 1 further characterized in that said hydrocarbon mixture is premixed with said first mentioned solvent composition prior to contacting said mixture in said stripping column.

5. The process of claim 1 further characterized in that said aromatic fraction is fractionally distilled to separate the individual aromatic hydrocarbons present in said mixture.

6. The process of claim 5 further characterized in that said mixture comprises benzene, toluene, and xylene.

7. The process of claim 1 further characterized in that said solvent composition contains a polyalkylene glycol.

8. The solvent composition of claim 7 further characterized in that said polyalkylene glycol contains from 2 to about 20% by weight of water.

9. The process of claim 7 further characterized in that said polyalkylene glycol comprises diethylene glycol.

References Cited in the file of this patent

UNITED STATES PATENTS

| | | |
|---|---|---|
| 2,215,915 | Cope et al. | Sept. 24, 1940 |
| 2,257,283 | Snow | Sept. 30, 1941 |
| 2,325,379 | Durrum | July 27, 1943 |
| 2,730,558 | Gerhold | Jan. 10, 1956 |
| 2,770,663 | Grote | Nov. 13, 1956 |
| 2,773,918 | Stephens | Dec. 11, 1956 |
| 2,775,627 | Lavender | Dec. 25, 1956 |
| 2,794,839 | Broughton | June 4, 1957 |

FOREIGN PATENTS

| | | |
|---|---|---|
| 513,051 | Belgium | Aug. 14, 1952 |